United States Patent
Koizumi et al.

(10) Patent No.: US 6,423,263 B1
(45) Date of Patent: *Jul. 23, 2002

(54) METHOD FOR PRODUCING MOLDED CRYSTALLINE RESIN ARTICLE

(75) Inventors: Junji Koizumi; Katsushi Ito; Haruyasu Mizutani, all of Aichi-ken (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,458

(22) Filed: Feb. 24, 1998

(30) Foreign Application Priority Data

Feb. 25, 1997 (JP) ............................... 9-058427

(51) Int. Cl.⁷ ............................... B29C 59/16
(52) U.S. Cl. ............... 264/446; 264/234; 264/235; 264/345; 264/346; 264/454; 264/458; 264/478; 264/492; 264/521
(58) Field of Search ............... 264/234, 235, 264/345, 346, 521, 446, 454, 458, 478, 492, 904

(56) References Cited

U.S. PATENT DOCUMENTS

| | | | |
|---|---|---|---|
| 3,544,673 A | * 12/1970 | Inskeep et al. | 264/235 |
| 3,878,033 A | * 4/1975 | Zavasnik | 428/36 |
| 4,039,641 A | * 8/1977 | Collins | 264/28 |
| 4,704,329 A | * 11/1987 | Hancock et al. | 428/369 |
| 5,176,839 A | * 1/1993 | Kim | 249/78 |
| 5,378,421 A | * 1/1995 | Salame | 264/235 |
| 5,474,732 A | * 12/1995 | Korthoff et al. | 264/235 |
| 5,718,860 A | * 2/1998 | Lee et al. | 264/210.5 |
| 5,741,446 A | * 4/1998 | Tahara et al. | 264/1.9 |
| 5,763,534 A | * 6/1998 | Srinivasan et al. | 525/240 |
| 5,800,912 A | * 9/1998 | Osigo et al. | 428/323 |

FOREIGN PATENT DOCUMENTS

| | | | | |
|---|---|---|---|---|
| JP | 60-18334 | * | 1/1985 | 264/346 |
| JP | 8-127107 | | 5/1996 | |

\* cited by examiner

*Primary Examiner*—Suzanne E. McDowell
(74) *Attorney, Agent, or Firm*—Pillsbury Winthrop LLP

(57) ABSTRACT

To provide a method for producing a molded crystalline resin article which enables a higher crystallization degree and to mass-produce the molded crystalline resin articles. The method comprises molding a molded resin article from a thermoplastic resin containing a crystalline resin followed by performing a heating process to obtain a molded crystalline resin article having a surface layer whose crystallization index is 0.9 or higher when determined by IR spectrometry. It is preferable that the temperature of the heating process is within the range of 20° C. lower than the crystallization temperature of the molded resin article to 30° C. higher than the crystalline temperature, and that the crystalline resin is a polypropylene resin.

18 Claims, 1 Drawing Sheet

METHOD FOR PRODUCING MOLDED CRYSTALLINE RESIN ARTICLE

BACKGROUND OF THE INVENTION

1. Field of the Invention

This invention relates to a method for producing a molded crystalline resin article and especially a method of crystallizing the molded resin article.

2. Detailed Description of the Related Arts

Exterior equipment such as side moldings and bumper corners have conventionally been required to be highly glossy for the purpose of exhibiting an appearance of high quality. For this type of exterior equipment, those that are obtained by molding resins are generally employed because they are readily incorporated into automobiles and have satisfactory pliability and strength.

Examples of such molded resin articles are those having a double-layered structure consisting of a core layer and a skin layer (Japanese Laid-Open Publication No. 8-127107). A core layer is present as a composite material having suitable pliability and rigidity which is obtained by mixing a polypropylene resin with a rubber component. A skin layer is made from a material obtained by mixing a crystalline polypropylene resin having a high Rockwell hardness with additives such as a colorant, and exhibits a satisfactory appearance, high gloss, metal-like surface and an anti-abrasion property.

A molded resin article which has the two layers described above is produced by a two-color molding method in which the starting material for the core layer and the starting material for the skin layer are injected simultaneously into the cavity of a mold and then cooled.

However, the molded resin article described above has conventionally been produced by heating the mold to a high temperature during injection of the resin and then cooling the mold to a low temperature upon cooling the resin in order to obtain the anti-abrasion property. In such a procedure, a prolonged period to raise or lower the temperature of the mold is required, and an enormous energy consumption is associated therewith.

Thus, it has been difficult to produce a large amount of molded resin articles by molding resins at a low cost.

Accordingly, for the purpose of improving producibility, it was proposed that the temperature of the mold be kept at a temperature as low as about 30° C. and then the molded crystalline resin article is cooled rapidly. Nevertheless, such procedure undergoes insufficient crystallization of the skin layer of the resin article especially at its surface, resulting in a poor abrasion resistance.

SUMMARY OF THE INVENTION

In view of the hitherto problems described above, the object of this invention is to provide a method for producing a molded crystalline resin article which raises the degree of the crystallization to a high degree and further, to mass-produce the molded crystalline resin articles.

This invention provides a method for producing a molded crystalline resin article comprising molding a molded resin article from a thermoplastic resin containing a crystalline resin followed by performing a heating process to obtain a molded crystalline resin article having a surface region with a crystallization index of 0.9 or higher when determined by IR spectrometry.

In the present invention, a crystallization index means a value based on which the crystallization degree of a molded resin article can be evaluated. The crystallization index can be obtained by determining IR spectrum and then calculating the ratio of the peak intensity of the crystal portion to the peak intensity of the non-crystal portion.

In the present invention, a thermoplastic resin containing a crystalline resin means a thermoplastic resin that is partly or entirely formed of a crystalline resin. Thus, all or part of the thermoplastic resin is crystalline resin. In order to obtain a surface layer with a crystalline index of 0.9 or more, the crystalline resin should be contained in the thermoplastic resin which constitutes the surface layer.

Specifically, it is favorable that the crystalline resin is present in the thermoplastic resin in a range of 20–100 wt. % since this weight percent range enables formation of a surface layer with a crystalline index of 0.9 or more. On the other hand, where less than 20 wt. % crystalline resin is present, a crystalline index or 0.9 or more may not be obtained since the amount of the crystalline resin present is too low.

Further, it is more favorable that the crystalline resin is present in the thermoplastic resin in a range of 30–100 wt. %. With this range, a surface layer with a crystalline index of 0.9 or more can be more easily formed.

The surface layer of the molded crystalline resin article is readily subjected to the effect of atmospheric temperature since it is located on the surface of the molded crystalline resin article. Therefore, on the surface, the temperature is lowered more quickly and the crystallization tends to proceed insufficiently when compared with the inner portion of the resin article.

To solve this problem, the resin article is heated after being molded in the present invention. Therefore, the heating serves to promote further crystallization in the surface layer of the molded resin article.

The molded resin article is heated so that the crystallization index of the surface layer becomes 0.9 or higher. Accordingly, the crystallization of the surface layer of the molded resin article can be proceeded sufficiently. As a result, the surface layer of the molded resin article is brought to the state where the crystallization is almost saturated. Therefore, a highly crystalline molded resin article can be obtained. The upper limit of the crystallization index may vary depending on the crystallization degree specific to a certain crystalline resin, and, for example, that of a polypropylene resin is about 1.03.

Since the surface layer is highly crystalline, it exhibits excellent abrasion resistance, excellent appearance, a high gloss and a metal-like surface.

In addition, since the heating process serves to establish a state where the crystallization is almost saturated, a subsequent process in which the article is cooled gradually to proceed the crystallization is not required. Accordingly, the cooling after the heating process can be performed quickly.

Therefore, a highly crystalline molded resin article can be produced in a short time at a high efficiency. In addition, the energy consumed during the production can be reduced since the mold employed to mold the resin article can be kept at a low temperature.

On the other hand, when the crystallization index of the surface layer after the heating process is less than 0.9, the crystallization of the surface layer is insufficient, resulting in a reduced abrasion resistance and a poor appearance.

According to the present invention, the crystallization degree of a molded crystalline resin article can be raised to a higher degree, and a method for producing a molded crystalline resin article on a large scale is provided.

DETAILED DESCRIPTION OF THE INVENTION

Figure 1:
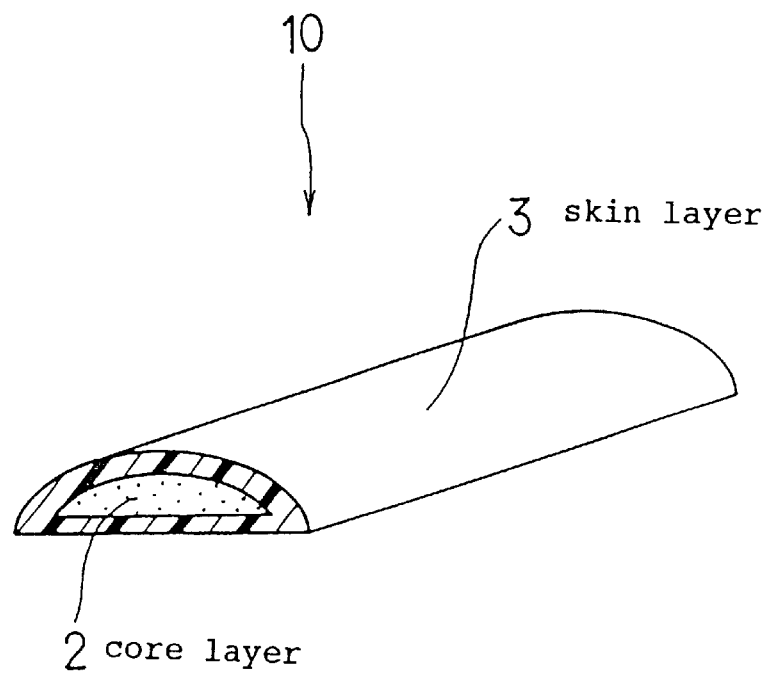
FIG. 1 is a perspective, partial cutaway view of the side molding according to Embodiment 7.

The temperature of the heating process described above is preferably in a range of 20° C. lower than the crystallization temperature of the molded resin article to 30+ C. higher than the crystallization temperature. This temperature range serves to further improve the crystallization of the surface layer. On the other hand, when the article is heated at a temperature more than 20° C. lower than the crystallization temperature, the crystallization of the surface layer may become insufficient.

When the article is heated at a temperature more than 30+ C. higher than the crystallization temperature, wrinkles may be formed on the surface layer. A higher production cost due to energy waste may also be associated.

The crystalline resin described above is preferably a polypropylene resin, by which a further higher crystallization degree of the surface layer can be achieved.

The molded crystalline resin article described above is preferably a side molding. In such a case, the molded crystalline resin article can be employed wherein the advantage described above is experienced most effectively.

In addition to the side molding mentioned above, the molded crystalline resin article may also be applied to exterior equipment such as wheel covers, side garnishes, locker panels, bumpers, bumper corners, spoilers, center pillars and the like, interior equipment such as meter cluster panels, center cluster panels, garnishes and the like, as well as various industrial devices such as transportation devices, electric products and the like which are required to be glossy. The molded article described above may be produced by two-layer extrusion and two-layer blow molding in addition to sandwich injection molding.

Embodiments 1 to 6

The preferred embodiments of the present invention are illustrated referring to Comparatives.

A thermoplastic resin was prepared by adding 2.3 parts by weight of a colorant to 100 parts by weight of a crystalline thermoplastic polypropylene resin. The colorant consisted of 0.2 parts by weight of carbon black, 0.3 parts by weight of phthalocyanine blue, 0.1 parts by weight of benzine yellow, 0.2 parts by weight of titanium oxide, 0.5 parts by weight of magnesium stearate and 1.0 parts by weight of aluminum powder.

The thermoplastic resin prepared as above was injected into a mold of a injection molding machine and molded into a plate having a mirror surface of the size of 150 mm×150 mm×2 mm. The cylinder clamping force of the injection molding machine was 80 tons.

The molded plate obtained was subjected to the heating process. The heating process was conducted by two methods, namely, a gear oven method in which the molded plate was placed in an electric furnace and blown with hot air, and an intermediate infrared irradiation method. In the gear oven method, the heating temperature and the heating period were varied as indicated in Table 1. In the intermediate infrared irradiation method, the intermediate infrared radiation having the peak wavelength of about 3 Am was irradiated for 1 minute to raise the temperature of the surface of the molded plate to 140° C.

The molded resin articles obtained as described above were designated as Embodiments 1 to 6 and Comparatives 1 to 3, which are shown in Table 1. As a control, a molded resin article which had not been heated was produced and designated as Comparative 4.

Subsequently, the crystallization temperature of the thermoplastic resin employed to prepare the molded resin articles was determined by a differential scanning calorimeter (DSC). In DSC analysis, about 10 mg of flakes taken by abrading the surface of the molded resin article was employed as a sample, which was cooled from 220° C. to 50° C. at the rate of 10° C./min under nitrogen atmosphere. During the course of the cooling, the temperature at which the sample was crystallized was recorded as the crystallization temperature. As a result, the crystallization temperature of the sample was 127° C.

The Rockwell hardness of the thermoplastic resin described above was 113 when determined according to ASTM D785. The melt flow rate was 45 g/10 min when determined according to ASTM D123.

Subsequently, various molded resin articles thus obtained were examined for the crystallization index, abrasion resistance and appearance of the surface.

The crystallization index was determined by IR spectrometry similar to the determination described above. Specifically, the ratio of the peak intensity of the crystal portion (998 $cm_{-1}$) to the peak intensity of the non-crystal portion (973 $cm_{-1}$) was determined as the crystallization degree by means of IR spectrometry.

The abrasion resistance was evaluated by a cotton canvas abrasion test and a scratch test. The cotton canvas abrasion test was performed using a JIS L0823 No. 1 device and mounting a JIS L3102 plane cotton canvas (mesh #10) on an abrader having an abrasion surface of 1 cm×1 cm, which was moved back and forth for 40 rounds under the load of 500 g. The result was indicated as ⊚ when no abrasion was observed in this cotton canvas abrasion test, as ◯ when almost no abrasion was observed, as Δ when abrasion was observed slightly and as X when marked abrasion was observed.

The scratch test was conducted by the method according to JIS K5400, except for using the load of 20 g and an iron rod instead of a pencil.

Also in this scratch test, the results were evaluated similarly as in the cotton canvas abrasion test described above. The appearance of the surface was evaluated visually. The result was indicated as X when damages such as wrinkles due to melting or flow end vaporization were noted on the surface of the molded resin article and as ◯ when no such damages were noted.

The results are shown in Table 1.

TABLE 1

| | | | abrasion resistance evaluation | | |
|---|---|---|---|---|---|
| | heating condition | crystallization index | cotton canvas abrasion test | scratch test | surface appearance |
| Comparative 1 | gear oven, 80° C. × 30 min | 0.82 | X | X (96) | ○ |
| Comparative 2 | gear oven, 100° C. × 30 min | 0.85 | Δ | X (97) | ○ |
| Embodiment 1 | gear oven, 120° C. × 30 min | 0.91 | ○ | Δ (80) | ○ |
| Embodiment 2 | gear oven, 130° C. × 30 min | 0.95 | ⊙ | ○ (73) | ○ |
| Embodiment 3 | gear oven, 140° C. × 5 min | 0.94 | ○ | ○ (75) | ○ |
| Embodiment 4 | gear oven, 140° C. × 10 min | 0.98 | ⊙ | ⊙ (60) | ○ |
| Embodiment 5 | gear oven, 140° C. × 30 min | 1.00 | ⊙ | ⊙ (55) | ○ |
| Comparative 3 | gear oven, 160° C. × 10 min | —* | —* | —* | X |
| Embodiment 6 | intermediate infrared irradiation, 140° C. × 1 min | 0.91 | ○ | Δ (71) | ○ |
| Comparative 4 | unheated (control) | 0.71 | X | X (113) | ○ |

— * unable to examine due to generation of wrinkles on the surface layer

As evident from Table 1, in embodiments 1 to 6, the heating temperature was within the range from −20° C. to +30° C. from the crystallization temperature (Tc) of the thermoplastic resin, exhibiting the excellent results.

On the other hand, Comparatives 1, 2 and 4 exhibited lower abrasion resistance. Comparative 3 underwent wrinkle formation on the surface of the molded resin article, which made the evaluation for the anti-abrasion property impossible, and caused poor appearance. In Comparatives 1 and 2, the heating temperature was more than 20° C. lower than the crystallization temperature (Tc), suggesting that the heating process had no effects. In Comparative 3, wrinkles were formed on the surface possibly because of the excessively higher heating temperature.

Embodiment 7

The molded crystalline resin article of this invention is a side molding formed of a core layer 2 and a skin layer 3 coated around the core layer 2 as shown in FIG. 1. The core layer 2 consists of polypropylene composite materials and the skin layer 3 consists of a mixture of a polypropylene resin and colorant.

The polypropylene resin in the skin layer 3 was a polypropylene resin having a Rockwell hardness of 113, containing no ethylene as in Embodiment 1. As the colorant, the same colorant in Embodiment 1 was used. The polypropylene composite material in the core layer 2 described above consists of 30% by weight of highly crystalline polypropylene resin, 60% by weight of unfixed ethylene propylene rubber, and 10% by weight of talc.

The highly crystalline polypropylene resin has 4.3% by weight of ethylene content and its melt flow rate is 30 g/10 min. The unfixed ethylene propylene rubber has a Mooney Viscosity $ML_{1+4}$ (100° C.) of 15 and 24% by weight of propylene content.

The side molding 10 of this invention was molded by a sandwich injection molding machine, using the above-described materials. This side molding 10 exhibits an anti-abrasion property, a high gloss as excellent as a painted article, a metal-like surface, and is able to function as a side molding sufficiently.

Further, this side molding has excellent pliability and rigidity since it comprises a double-layered structure consisting of a core layer and a skin layer.

What is claimed is:
1. A method for producing a molded resin article comprising:
   molding a thermoplastic resin material into a mold, the thermoplastic resin material composed at least partly of a polypropylene crystalline resin, the thermoplastic resin material further being characterized by a crystallization temperature;
   removing the molded resin article from the mold, the molded resin article having an outer surface;
   transferring the molded resin article to a heat treatment apparatus;
   heating the molded resin article; and
   cooling the molded resin article to obtain a crystallization index of at least 0.9 in the outer surface.
2. The method for producing a molded resin article according to claim 1, wherein heating the resin article is accomplished by heating said resin article to a temperature approximately between 20° C. below a resin crystallization temperature and 30° C. above the crystallization temperature.
3. The method for producing a crystalline resin article of claim 1, further comprising molding the resin article wherein the crystalline resin is present in the thermoplastic resin of the surface layer in a range of 20–100% by weight.
4. The method of preparing a crystalline resin article of claim 1, wherein molding the resin article is accomplished by either two-layer extrusion, two-layer blow-molding or sandwich injection molding.
5. The method for producing a crystalline resin article of claim 1, further including the additional step of determining the surface layer crystallization index using IR spectrometry.
6. The method for producing a crystalline resin article of claim 5, wherein said surface layer crystallization index is the ratio of the peak intensity of a crystal portion to the peak intensity of a non-crystal portion as determined using IR spectrometry.
7. The method for producing a crystalline resin article of claim 1, further including the additional step of cooling the crystalline resin article after heating.
8. A method for producing a resin bumper corner comprising the steps of:
   molding a resin bumper corner from a thermoplastic resin material composed at least partly of a polypropylene crystalline resin, the molded resin bumper corner having an outer surface and the polypropylene crystalline resin being characterized by a resin crystallization temperature;

heating the outer surface of the molded resin bumper corner to a treatment temperature;

maintaining the treatment temperature for a duration sufficient to obtain a crystallization index of at least 0.9 in the outer surface, wherein the treatment temperature is within a range between approximately 20° C. below the resin crystallization temperature and 30° C. above the resin crystallization temperature.

9. A method for producing a resin bumper corner according to claim 8, wherein the amount of polypropylene crystalline resin comprises at least about 20 percent by weight of the thermoplastic resin comprising the outer surface.

10. A method for producing a resin bumper corner according to claim 8, wherein the step of molding the resin bumper corner further comprises a two-layer extrusion, a two-layer blow-molding or a sandwich injection molding.

11. A method for producing a resin bumper corner according to claim 8, further comprising the step of determining the surface layer crystallization index using IR spectrometry.

12. A method for producing a side molding comprising:

molding a thermoplastic resin material into a mold, the thermoplastic resin material composed at least partly of a polypropylene crystalline resin, the thermoplastic resin material further being characterized by a crystallization temperature;

removing the side molding from the mold, the side molding having an outer surface;

transferring the side molding to a heat treatment apparatus;

heating the side molding; and cooling the side molding to obtain a crystallization index of at least 0.9 in the outer surface.

13. The method for producing a side molding of claim 12, wherein heating is accomplished by heating said resin article to a temperature ranging approximately between 20° C. below a resin crystallization temperature of the crystalline resin and 30° C. above such resin crystallization temperature.

14. The method for producing a side molding of claim 12, wherein the amount of crystalline resin is within the range of about 20–100% by weight of the thermoplastic resin of the surface layer.

15. The method for producing a side molding of claim 12, wherein molding a resin article is accomplished by either two-layer extrusion, two-layer blow-molding or sandwich injection molding.

16. The method for producing a side molding of claim 12, further including the step of determining the surface layer crystallization index using IR spectrometry.

17. The method for producing a resin bumper corner of claim 16, wherein said surface layer crystallization index is the ratio of the peak intensity of a crystal portion to the peak intensity of a non-crystal portion as determined using IR spectrometry.

18. The method for producing a resin bumper corner of claim 16, wherein said surface layer crystallization index is the ratio of the peak intensity of a crystal portion to the peak intensity of a non-crystal portion as determined using IR spectrometry.

* * * * *